(12) United States Patent
Iwasaki

(10) Patent No.: US 7,717,482 B2
(45) Date of Patent: May 18, 2010

(54) SUCKINGLY CONVEYING APPARATUS

(75) Inventor: Yoshikazu Iwasaki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/535,845

(22) PCT Filed: Nov. 20, 2003

(86) PCT No.: PCT/JP03/14834

§ 371 (c)(1),
(2), (4) Date: May 20, 2005

(87) PCT Pub. No.: WO2004/045809

PCT Pub. Date: Jun. 3, 2004

(65) Prior Publication Data

US 2006/0055190 A1   Mar. 16, 2006

(30) Foreign Application Priority Data

Nov. 21, 2002   (JP)   ............................. 2002-338247

(51) Int. Cl.
   *B25J 15/06*   (2006.01)
(52) U.S. Cl. .................................... 294/64.1
(58) Field of Classification Search ............... 294/64.1, 294/65; 271/11, 93, 103, 104
   See application file for complete search history.

(56) References Cited

U.S. PATENT DOCUMENTS

| 2,853,333 | A | * | 9/1958 | Littell ......................... 294/64.1 |
| 3,720,433 | A | * | 3/1973 | Rosfelder ................... 294/64.1 |
| 4,432,701 | A |   | 2/1984 | Ise |
| 4,443,099 | A | * | 4/1984 | Linman et al. ................ 271/11 |
| 5,048,811 | A | * | 9/1991 | Hochbein ................... 294/64.1 |
| 5,100,121 | A | * | 3/1992 | Takei et al. .................. 271/104 |
| 5,425,402 | A | * | 6/1995 | Pringle ...................... 414/796.2 |
| 5,800,646 | A | * | 9/1998 | Syori et al. .................... 156/64 |
| 6,010,125 | A | * | 1/2000 | Nakajima ..................... 271/11 |
| 6,398,208 | B1 |  | 6/2002 | Yang et al. |
| 2002/0011735 | A1 | * | 1/2002 | Nagai et al. ................ 294/64.1 |

FOREIGN PATENT DOCUMENTS

| DE | 27 39 455 A1 | 1/1979 |
| EP | 659666 A1 | 6/1995 |
| JP | 59-019647 A | 2/1984 |
| JP | 60-127935 A | 7/1985 |

(Continued)

*Primary Examiner*—Paul T Chin
(74) *Attorney, Agent, or Firm*—Sughrue Mion, PLLC

(57) ABSTRACT

A vacuum conveying apparatus capable of adhering and conveying a sticky material such as an intermediate process material for tire, and of immediately separating the same at a release position. A vacuum face (120) of the vacuum conveying apparatus (100) is provided with a multitude of vacuum adhesion orifices (122) communicating with a vacuum duct, in a region below the vacuum duct, and there are provided a plurality of press-down pins capable of protruding from the vacuum face (120) at a release position of the material as adhered for forcibly adhering the same material and a plurality of air nozzles (125). Further, a plurality of L-shaped vacuum adhesion grooves (127), (128) are disposed in regions at respective end parts of the vacuum face (120) other than the region below the vacuum duct, for adhering the tip of the material to be adhered which moved in a slightly zigzag direction.

11 Claims, 6 Drawing Sheets

FOREIGN PATENT DOCUMENTS

| | | |
|---|---|---|
| JP | 10-86085 A | 4/1998 |
| JP | 10-180667 A | 7/1998 |
| JP | 2000-286543 A | 10/2000 |
| JP | 2000-326275 A | 11/2000 |
| JP | 2002-43353 A | 2/2002 |

* cited by examiner

FIG. 5

| timing of electromagnetic valve operation | ④return | ①adhesion | ②conveyance | ③release | ④return | |
|---|---|---|---|---|---|---|
| vacuum 1 | | after 0.4sec of a return command, a solenoid is turned ON | | | | |
| vacuum 2 | | the same as above | | | | |
| break (blow) 1 | | | | upon completion of the conveyance, the solenoid is turned ON for 0.1 sec | | |
| break (blow) 2 | | | | the same as above | | |
| blow 3 | | | | upon completion of the conveyance, a solenoid is turned ON for 0.2 sec | | |
| lower frame | | | upon a command for starting conveyance, the lower frame falls with the solenoid turned ON | | upon completion of the conveyance, the lower frame rises with the solenoid turned ON | |
| PIN operation (down) (up when OFF) | | | | | the solenoid is turned ON in sync with the blow 3 | | standby position ← → upon detection of rise of the ram a return command is ON

SUCKINGLY CONVEYING APPARATUS

TECHNICAL FIELD

The invention relates to a vacuum conveying apparatus, and more particularly, to a vacuum conveying apparatus capable of suction-adhering, for example, an intermediate process material for tires, particularly, sticky material such as a carcass material including plies, belt, and so forth, for high-speed conveyance, and forcefully separating the same at a predetermined position to thereby prevent adhesion.

BACKGROUND TECHNOLOGY

A conveying apparatus provided with means for vacuum adhesion is used for executing an operation to handle, for example, a work material, that is, an operation to pick up the work material placed at a standby position, and to convey the same to a predetermined position to be unloaded at the predetermined position.

With such a conveying apparatus provided with means for vacuum adhesion, the material adhered can be easily released by the agency of gravity simply by applying vacuum break thereto upon reaching the predetermined position unless material conveyed is sticky, or extremely light in weight. However, in the case of conveying by means of vacuum adhesion an intermediate process material used in manufacturing, for example, tires, particularly, a sticky material such as plies, belt, and so forth, it is not easy to separate the material already adhered from a vacuum face of the conveying apparatus. That is, simply by feeding break air to a vacuum duct, and so forth, separation cannot be completed, resulting in incomplete separation at times. If the separation is incomplete, a portion of the material remains adhered in a state as-adhered to the vacuum face of the conveying apparatus when the vacuum conveying apparatus is in return operation after conveyance of the material, causing problems such as entrainment, and so forth, of the material due to inertia of the material that has been transferred at a high speed (3 m/sec), causing deviation in position. For this reason, means for facilitating separation have since been desired.

To cite an example although not in any Patent Document, in order to enhance separation property of a vacuum face of a vacuum conveying apparatus, surface treatment such as Teflon (registered trademark) coating is applied to the vacuum face, and the vacuum face is provided with a plurality of nozzles for jetting air to the suction-adhered material as supplementary means for promoting separation of the material, together with a multitude of vacuum adhesion orifices communicating with vacuum piping and vacuum ducts, thereby mitigating the adhesion force due to stickiness of a sticky material by the effect of the surface treatment when releasing the sticky material adhered, and forcefully separating the sticky material adhered by jetting air thereto.

With the conventional vacuum conveying apparatus, however, because time a delay occurs before the sticky material is released from vacuum adhesion even if break air is sent into the vacuum piping and so forth when the sticky material has been conveyed to a predetermined position, it is not possible in practice to immediately and completely separate the sticky material as adhered off the vacuum face even by jetting air thereto. Accordingly, the actual situation is that thr vacuum force is adjusted according to a degree of stickiness of material to be conveyed, and the shape thereof, so as not to allow a vacuum force greater than necessary to act thereon. Further, it is difficult to implement satisfactory coating of the vacuum face by the Teflon (registered trademark) coating, and so forth, so that satisfactory separation property is not necessarily provided.

Thus, with the conventional vacuum conveying apparatus, because of poor separation response of the vacuum break at the time of release, delay time is required between actuation of release by the vacuum conveying apparatus, and actual proceeding to the following step of operation, so that operation time is increased, thereby reducing productivity.

Further, with the conventional vacuum conveying apparatus, if the material to be adhered moves in a slightly zigzag direction, that is, is out of a normal position, an end of the material deviates from a region of the vacuum adhesion orifices of the vacuum face, and the atmosphere flows into the vacuum duct through part of the vacuum adhesion orifices, so that the suction pressure of the vacuum duct drops, thereby failing to perform normal adhesion. With the conventional vacuum conveying apparatus, this necessitates countermeasures to raise the suction pressure of the vacuum duct, and so forth, in addition to installation of an expensive device for preventing zigzag moves; however, if the suction pressure is raised, this will result in improper release of the material, as described above.

Further, with a conventional structure in which the vacuum face is caused to move up and down exactly according to up and down moves of a piston of an air cylinder, for example, in the case where the vacuum conveying apparatus standing by on a conveyer is caused to come down once to pick up the material to be adhered, and to immediately make an upward move, the piston is caused to rise after it has fully reached a bottom dead center, so that delay occurs at the bottom dead center. Accordingly, if the operation is executed at an estimated timing in order to avoid such delay, this will cause a problem that the piston rises before reaching the bottom dead center, thereby inducing improper adhesion.

The invention has been developed to solve such problems as encountered in the past, and it is therefore a first object of the invention to speedily implement a release operation of suction-adhered material by enabling the material, even if it is sticky, to be released immediately and with reliability at a release position.

A second object of the invention is to hold material as adhered with reliability, and without particular need for raising vacuum force even if the material as adhered moves in a slightly zigzag direction.

Further, a third object of the invention is to enable high-speed operations for adhesion, conveyance, and separation, respectively, to be implemented by reducing time delay occurring during up and down moves of a vacuum face.

DISCLOSURE OF THE INVENTION

It is a first object (aspect) of the present invention to provide a vacuum conveying apparatus characterized in comprising an upper frame, a lower frame capable of making up and down moves in relation to the upper frame, and a vacuum face provided on the lower frame, wherein the vacuum face is provided with a multitude of vacuum adhesion orifices communicating with a vacuum duct, in a region below the vacuum duct, and a plurality of vacuum adhesion grooves disposed in parallel with each other, communicating with the vacuum duct, in regions at respective ends of the vacuum face, other than the region below the vacuum duct.

It is a second aspect of the present invention to provide a vacuum conveying apparatus characterized in that in the first aspect of the invention, vacuum adhesion grooves may be in a shape substantially resembling the letter L in a plan view.

It is a third aspect of the present invention to provide a vacuum conveying apparatus characterized in that in the first or second aspect of the invention, the vacuum face may be provided with a plurality of press-down pins capable of protruding downward from the vacuum face at a position where the lower frame comes down at the time of release of adhesion by the vacuum conveying apparatus.

It is a fourth aspect of the present invention to provide a vacuum conveying apparatus characterized in that in the first or second aspect of the invention, surface treatment for prevention of adhesion is applied to the vacuum face, and the vacuum face is provided with a plurality of air nozzles for jetting air to material adhered at the time of the release of the adhesion by the vacuum conveying apparatus.

It is a fifth aspect of the present invention to provide a vacuum conveying apparatus characterized in that in the first or second aspect of the invention, the upper frame and the lower frame constitute a toggle mechanism driven by respective motions of a cylinder, and a piston, and said toggle mechanism is provided with links, one end of each of the links, being coaxially and pivotally attached to a piston rod of the piston while the other end thereof being pivotally attached to the upper frame, or the lower frame.

It is a sixth aspect of the present invention to provide a vacuum conveying apparatus characterized in that in the third aspect of the invention, surface treatment for prevention of adhesion is applied to the vacuum face, and the vacuum face is provided with a plurality of air nozzles for jetting air to material adhered at the time of the release of the adhesion by the vacuum conveying apparatus.

It is a seventh aspect of the present invention to provide a vacuum conveying apparatus characterized in that in the third aspect of the invention, an upper frame and a lower frame constitute a toggle mechanism driven by respective motions of a cylinder, and a piston, and said toggle mechanism is provided with links, one end of each of the links, being coaxially and pivotally attached to a piston rod of the piston while the other end thereof being pivotally attached to the upper frame, or the lower frame.

It is an eighth aspect of the present invention to provide a vacuum conveying apparatus characterized in that in the fourth aspect of the invention, an upper frame and a lower frame constitute a toggle mechanism driven by respective motions of a cylinder, and a piston, and said toggle mechanism is provided with links, one end of each of the links, being coaxially and pivotally attached to a piston rod of the piston while the other end thereof being pivotally attached to the upper frame, or the lower frame.

It is a ninth aspect of the present invention to provide a vacuum conveying apparatus characterized in comprising an upper frame, a lower frame capable of making up and down moves in relation to the upper frame, and a vacuum face provided on the lower frame, the lower frame is structured so as to be capable of making the up and down moves in relation to the upper frame through a toggle mechanism driven by respective motions of a cylinder, and a piston.

It is a tenth aspect of the present invention to provide a vacuum conveying apparatus characterized in that in the ninth aspect of the invention, the toggle mechanism is provided with links, one end of each of the links, being coaxially and pivotally attached to a piston rod of the piston while the other end thereof being pivotally attached to the upper frame, or the lower frame.

With the vacuum conveying apparatus according to the first and second aspects of the invention, drop in suction pressure never occurs even if material adhered moves in a zigzag direction, because the vacuum face is provided with the vacuum adhesion grooves disposed at a distance away form the vacuum duct, thereby ensuring adhesion of the material by the effect of the vacuum adhesion grooves, so that an expensive device for preventing zigzag moves, used in the past, is no longer required, resulting in reduction in cost.

Further, with the vacuum conveying apparatus according to the third aspects of the invention, the press-down pins are caused to protrude downward from the vacuum face at a separation position, so that even sticky material adhered can be forcefully and reliably separated.

Still further, with the vacuum conveying apparatus according to the fourth and sixths aspects of the invention, adhesion force due to stickiness of the sticky material can be mitigated, thereby enabling separation to be implemented with greater ease.

Further, with the vacuum conveying apparatus according to the fifth, seventh, eighth, ninth and tenth aspects of the invention, rise and fall of the lower frame is effected by laterally shifting a power point shift amount of the toggle type link-mechanism in use, thereby enabling adhesion operation at three positions of a standby position, adhesion position (bottom dead center), and conveyance position, and reverse operations of the conveyance position, a release position (bottom dead center, the same as the adhesion position), and a return-enable position (the same as the conveyance position) at the time of release to be effected by a single stroke operation of the cylinder, respectively, without repeated changes in bottom dead center position, and at high speed, so that adhesion, conveyance, and delivery of the material can be implemented at high speed and with reliability and high precision.

BRIEF DESCRIPTION OF THE DRAWINGS

FIG. 5 is an operation timing chart of electromagnetic valves for use in air cylinders, and so forth, used in the vacuum conveying apparatus.

BEST FORM FOR CARRYING OUT THE INVENTION

An embodiment of a vacuum conveying apparatus according to the invention is described hereinafter with reference to the accompanying drawings.

Figure 1:
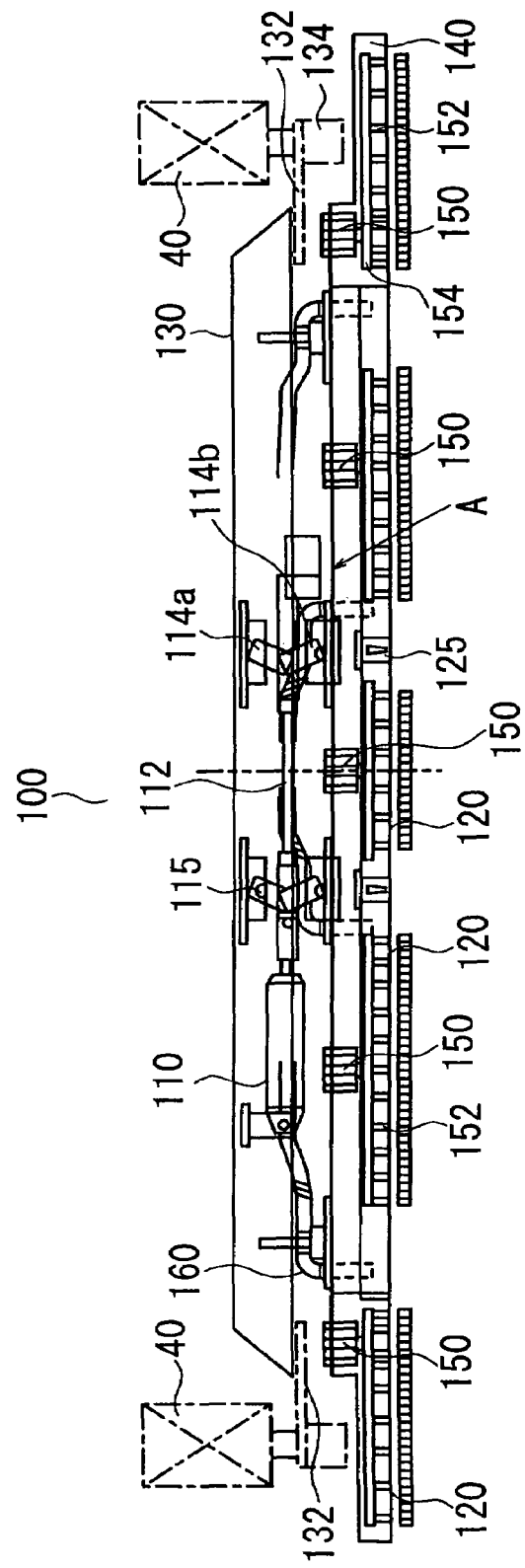
FIG. 1 is a front view of an embodiment of a vacuum conveying apparatus according to the invention.

FIG. 1 is a front view of the embodiment of the vacuum conveying apparatus according to the invention.

As shown in FIG. 1, the vacuum conveying apparatus 100 broadly comprises an upper frame 130, a lower frame 140 provided with a vacuum face described later on, and a toggle mechanism having an air cylinder 110 fixedly attached to the upper frame 130 for extendably connecting the upper frame 130 with the lower frame 140. A guide support 132 is secured to both right and left ends of the upper frame 130, and the guide supports 132 each are fixedly attached to, for example, a drive support 134 supported by a support frame 40, thereby providing means for conveying the vacuum conveying apparatus in whole along the support frames 40 by optional drive means (not shown).

The air cylinders 110 are secured to the upper frame 130, and links 114a, 114b, made up of respective rocking pieces pivotally attached to the upper frame 130 and the lower frame 140, respectively, are coaxially and pivotally attached to a piston rod 112 of the air cylinders 110, at a plurality of spots thereof, as shown (FIGS. 1 and 4A-4C), constituting a toggle mechanism.

Accordingly, expansion and contraction of the piston rod 112 of the air cylinders 110 are accompanied by rocking of the respective links 114a, 114b of the toggle mechanism, thereby causing the lower frame 140 to undergo up and down moves.

The lower frame 140 is provided with a plurality of air nozzles 125 each positioned at suitable spots, in the longitudinal direction thereof, together with a plurality of air cylinders 150 positioned at substantially equal intervals, also in the longitudinal direction thereof. A pin support 154 having a plurality of press-down pins 152 is provided so as to be integral with the lower end of a piston of each of the air cylinders 150, and the respective air cylinders 150 are structured such that expansion thereof causes the press-down pins 152 to protrude from a vacuum face 120 as described later on.

Figure 2:
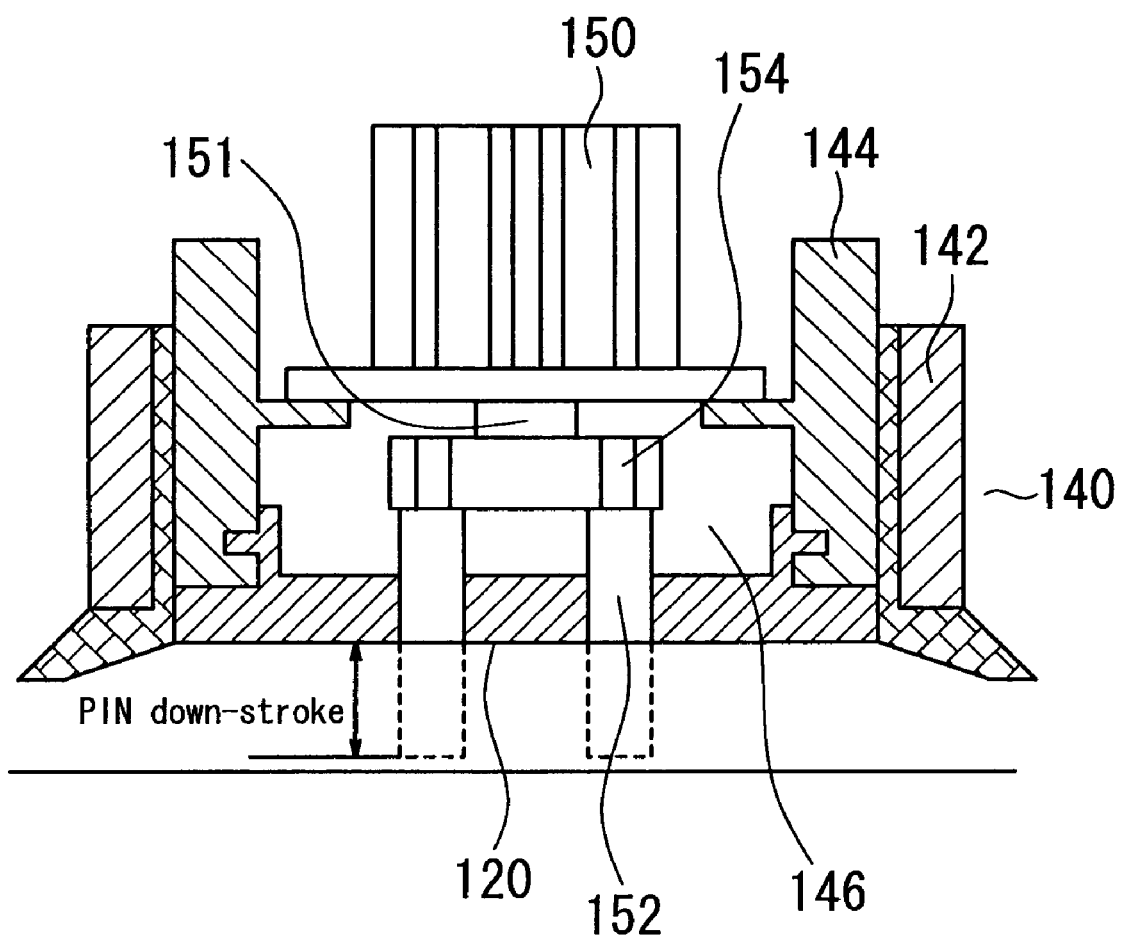
FIG. 2 is a sectional side elevation of a lower frame of the vacuum conveying apparatus in FIG. 1.

FIG. 2 is a sectional side elevation of the lower frame. As shown in the figure, the lower frame 140 comprises outside lower frames 142, and inside lower frames 144 within the respective outside lower frames 142. The inside lower frames 144 are provided with the vacuum faces 120 for suction-adhering a material, such as a carcass material including, for example, plies, belt, and so forth, of a tire, positioned at the lower ends of the respective inside lower frames 144, and a pin support 154 linked with the pistons 151 of each of the air cylinders 150 causes the press-down pins 152 to protrude from the vacuum face 120, as shown by broken lines in the figure, by a down-stroke of the pistons 151, to forcefully separate the suction-adhered material at a release position as described later on.

Figure 3:
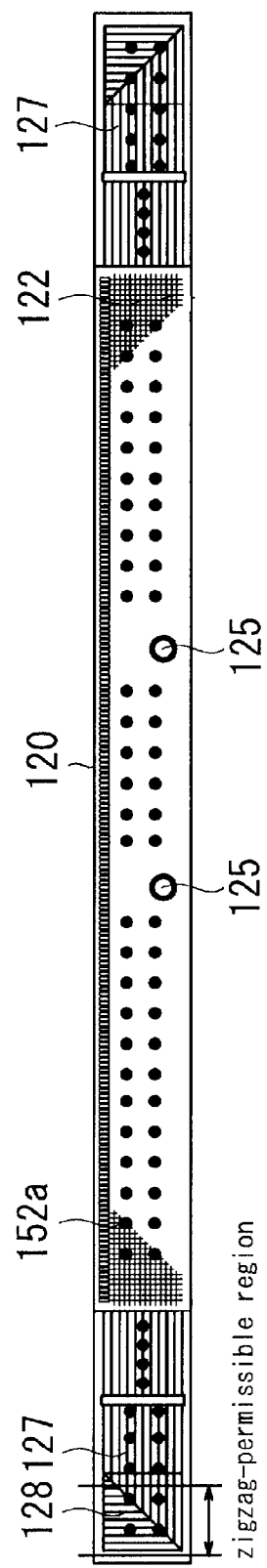
FIG. 3 is a view showing a vacuum face of the vacuum conveying apparatus.

FIG. 3 is a view showing the vacuum face 120 provided at the lower ends of the respective inside lower frames 144. There are provided a multitude of vacuum adhesion orifices 122 communicating with a vacuum duct 146 (FIG. 2), open to the vacuum face 120, and a plurality of vacuum adhesion grooves 127 for vacuum-adhering the material M (FIG. 4) to be adhered by communicating with the vacuum duct 146, running in parallel with each other, in the longitudinal direction of the vacuum face 120, in parts of the vacuum face 120, under the influence of a zigzag move of the material, that is, in zigzag-permissible regions at both ends of the vacuum face 120, respectively, as shown in the figure, and further, the ends of the respective vacuum adhesion grooves 127 communicate with vacuum adhesion grooves 128, respectively, with the other ends closed, also communicating with the vacuum duct 146, and crossing the vacuum adhesion grooves 127 at right angles. That is, the end parts of the vacuum face 120 each are provided with grooves in a shape resembling the letter L, 1 mm in depth, and 8 mm in interval, running in parallel with the direction of flow of the material adhered, and with the direction of conveyance, and the grooves are disposed in parallel with each other, and at equal intervals therebetween against respective square parts of the vacuum face 120.

Now, the parts of the vacuum face 120, provided with the L-shaped vacuum adhesion grooves, are installed away by an interval from the vacuum duct 146 installed in a region outside the influence of the zigzag move of the material M as adhered, and the material M yet to be adhered undergoes vacuum adhesion by the agency of vacuum in the vacuum duct 146. That is, as shown in FIG. 3, the vacuum adhesion grooves 127, 128 are only disposed in regions at respective ends of the vacuum face 120 which are not below the vacuum duct 146. Accordingly, with the present vacuum conveying apparatus, even if the material M as adhered moves in a zigzag direction, the vacuum adhesion grooves 127, 128, (which form an L-shape) covered by the material M, implement vacuum adhesion of the material M, and portions of the parts of the vacuum face 120, provided with the L-shaped vacuum adhesion grooves, from which the material M is dislodged, will be disposed to the atmosphere, however, since the vacuum duct 146 is installed away those portions with the L-shaped vacuum adhesion grooves, drop in suction pressure never occurs. Thus, the present invention provides an improvement over the conventional apparatus, wherein if the material M as adhered moves in the zigzag direction to become thereby dislodged from the vacuum face, the atmosphere flows into the vacuum duct 146 through part of the vacuum face, from which the adhered material M is dislodged, thereby causing improper adhesion, and separating the tip of the material M, in the direction of conveyance, in such a way as to curl up the same.

The vacuum face 120 is further provided with insertion hole 152a for the press-down pins 152, respectively, disposed as to be evenly distributed across the surface thereof, and the press-down pins 152 protrude from inside of the vacuum face, that is, inside of the vacuum duct 146, at the down-stroke of the pistons 151, thereby pressing down the adhered material.

Down-timing of the press-down pins 152 is controlled so as to start upon the lower frame 140 of the vacuum conveying apparatus, reaching a down bottom dead center, and position control is made such that the forefront one of the press-down pins 152, toward the destination of conveyance, at the bottom dead center thereof, comes into contact with the upper face of a conveyer. As a result, regardless of stickiness of material, adhered material can be forcefully delivered to the destination of conveyance without causing deviation in position at the time of release.

As described above, with the present vacuum conveying apparatus, the adhered material can be forcefully separated off by causing the press-down pins 152 to protrude from inside of the vacuum face, however, in order to effect more reliable release operation, Teflon (registered trademark) coating is applied to the vacuum face after knurling is applied thereto, thereby enabling delay in operation actuated by variation in press-down pressure of the press-down pins 152 to be substantially eliminated.

Next, operations of the present vacuum conveying apparatus described in the foregoing are described hereinafter with reference to FIG. 4.

Figure 4A:
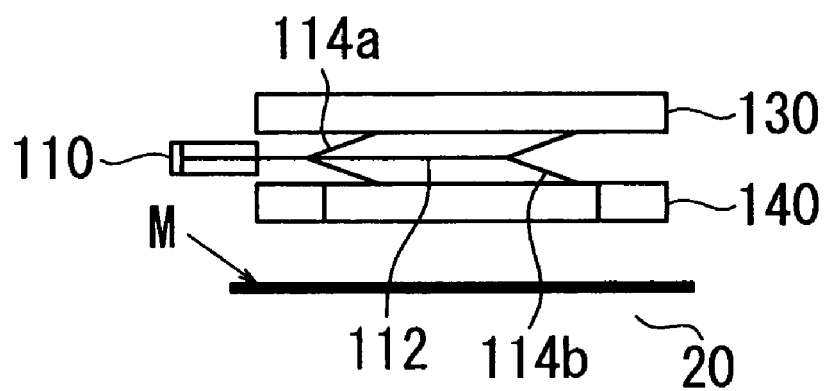
FIGS. 4A-4C are schematic illustrations showing operations of the vacuum conveying apparatus.

FIG. 4A shows the vacuum conveying apparatus 100 in the standby position. The vacuum conveying apparatus 100 is standing by above the material M, which has not yet been suction-adhered, situated on a conveyer 20. In this state, the piston rod 112 of the air cylinders 110 is retracted in the air cylinders 110, and the lower frame 140 is in a position away from the material M yet to be suction-adhered, that is, a position where the lower frame 140 does not interfere with the conveyer 20.

Figure 4B:
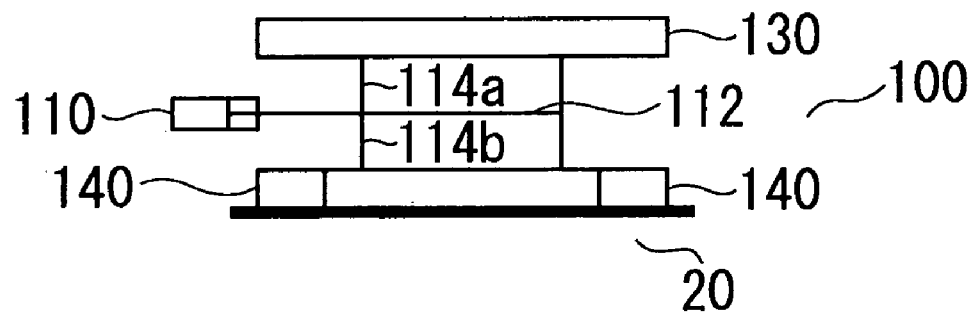

Next, in FIG. 4B, the piston rod 112 of the air cylinders 110 is in a position halfway between a retraction position and an extended position, where the links 114a, 114b of the toggle mechanism are rocked following the down-stroke of the piston rod 112 to be thereby lined up, in other words, the lower frame 140 is at the bottom dead center of the down-stroke. At this point in time, the vacuum face 120 of the vacuum conveying apparatus 100 comes into contact with the material M which is disposed on the conveyer 20, whereupon the vacuum adhesion orifices 122, and the L-shaped vacuum adhesion grooves 127, 128, provided in the vacuum face, are covered up, or blocked, by the material M, so that the material M is suction-adhered by the agency of the suction pressure of the vacuum adhesion orifices 122, and the L-shaped vacuum adhesion grooves 127, 128.

Figure 4C:
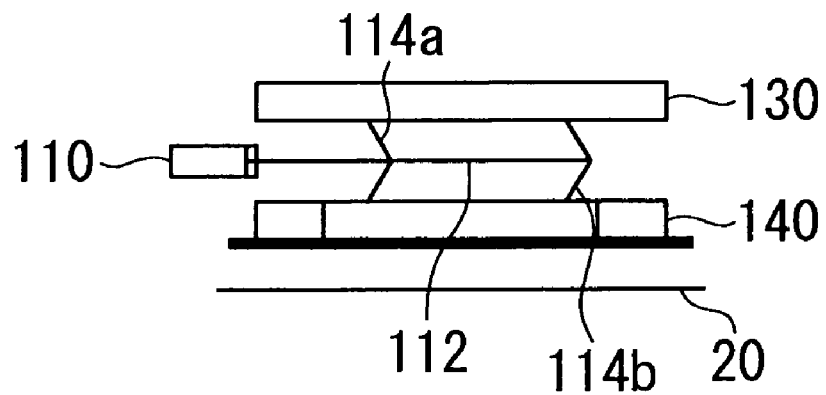

FIG. 4C shows a state where the piston rod 112 is extended to the maximum (at the bottom dead center). In this state, the toggle mechanism moves the vacuum face 120 with the material M suction-adhered thereto away from the conveyer 20, and the material M with one face suction-adhered to the vacuum face 120, is lifted off the conveyer 20, and conveyed to a predetermined position by the vacuum conveying apparatus 100.

Release of the suction-adhered material M, after conveyance thereof, is executed by retracting the piston rod 112 to the position shown in FIG. 4B. More specifically, in a state where the vacuum face 120 is kept in contact with another conveyer, vacuum break is implemented by sending break air into vacuum piping (not shown), and the vacuum duct 146, and the adhered material M is immediately separated from the vacuum face 120 by causing the press-down pins 152 to protrude from the vacuum face 120 while concurrently jetting air from the air nozzles 125 via an air supply source (not shown), and piping 160.

FIG. 5 is an operation timing chart of electromagnetic valves for use in air cylinders, and so forth, used in the vacuum conveying apparatus.

In the figure, vacuum 1, and vacuum 2 refer to respective electromagnetic valves provided in vacuum pipes communicating with the vacuum duct 146, and in this case, two vacuum apparatuses are employed. The chart shows that with respect to respective operations of the vacuum conveying apparatus, such as adhesion, conveyance, release, and return, during the return operation after the release, that is, after 0.4 sec of a return command, a solenoid is turned ON, and the respective electromagnetic valves are actuated, thereby connecting the vacuum duct 146 to a vacuum source.

Further, breaks (blow) 1, 2 indicate respective electromagnetic valve operation timings to effect respective vacuum breaks corresponding to the vacuum 1, 2. In this case, the solenoid is turned ON for 0.1 sec upon completion of the conveyance, and the respective electromagnetic valves are opened, thereby sending air into the vacuum duct 146.

Blow 3 indicates operation timing of an electromagnetic valve for jetting air as supplementary means at the time of separation of the adhered material M. In this case, a solenoid is turned ON for 0.2 sec upon completion of the conveyance, thereby jetting air onto the adhered material M.

Further, it is shown in the chart that rise of the lower frame is effected by turning the solenoid ON for only 0.1 sec at the time of the release, and fall of the lower frame is effected by turning the solenoid ON similarly for only 0.1 sec at the time of the adhesion.

Pin operation (down) shows that the solenoid is turned on for 0.3 sec upon the release of the material M adhered, that is, the completion of the conveyance, thereby actuating the air cylinders 150 for causing the press-down pins to come down.

Figure 6A:
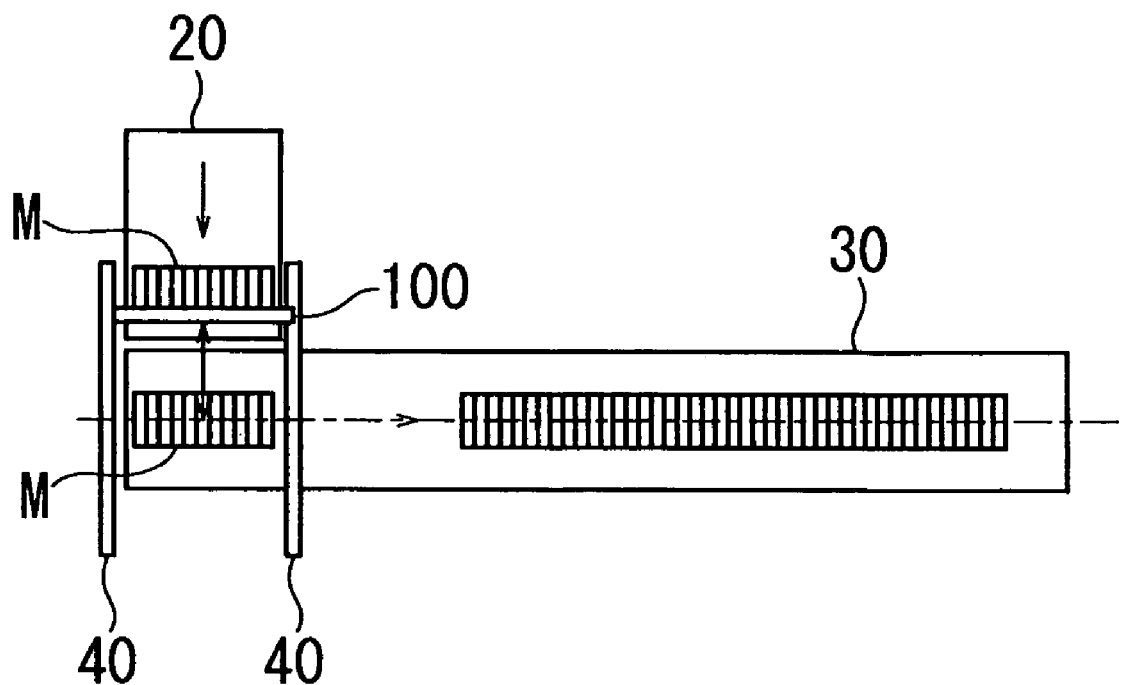
FIGS. 6A-6B are plan views broadly showing examples of actual application of the vacuum conveying apparatus according to the invention.
Figure 6B:
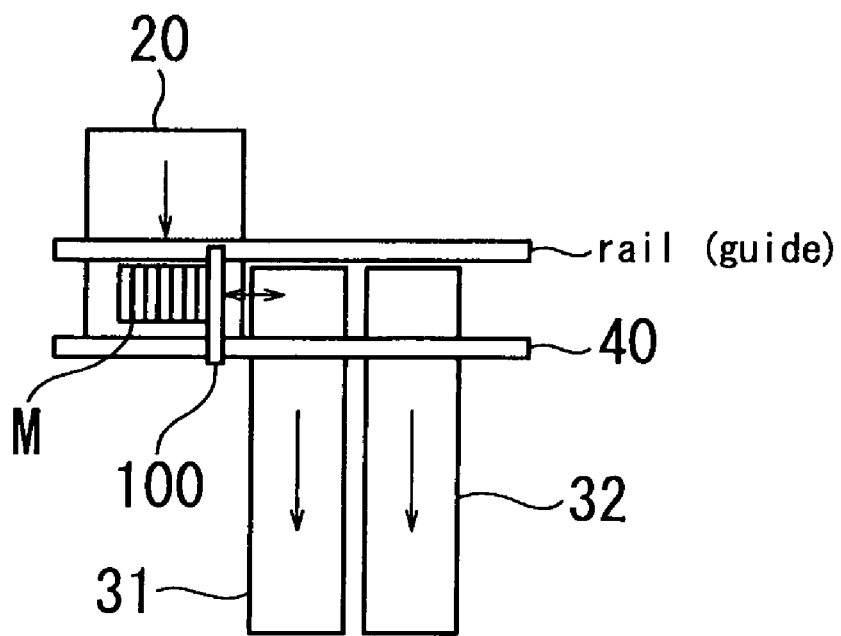

FIG. 6 is a schematic view broadly showing operation of the high-speed vacuum conveying apparatus according to the invention, and FIG. 6A is a schematic view showing the case of moving the adhered material M adhered in a parallel direction while FIG. 6B is a schematic view showing the case of moving the adhered material M in an orthogonal direction.

More specifically, the vacuum conveying apparatus 100, in a position shown in FIG. 6A, lowers the vacuum face 120 of the lower frame 140 by the toggle mechanism operated by the air cylinder 110 to cause the vacuum face 120 to come into contact with the leading tip of the material M of a predetermined width, thereby adhering the material M that has been conveyed by the conveyer 20 by agency of the vacuum adhesion orifices, and subsequently, the vacuum conveying apparatus 100 in that state moves the vacuum face 120 along pull-up guides 40 to a predetermined position over another conveyer 30 orthogonal thereto.

The vacuum conveying apparatus 100 having reached the predetermined position of the vacuum face 120 lowers the vacuum face 120 to thereby bring the material M as adhered in contact with the conveyer 30, whereupon the adhered material M is separated from the vacuum face 120 by causing the press-down pins to protrude from the vacuum face 120 and concurrently jetting air from the plurality of the air nozzles while vacuum break is concurrently carried out by sending break air into the vacuum adhesion orifices communicating with the vacuum piping, and the vacuum duct.

In the case of moving the adhered material M in the orthogonal direction, as shown in FIG. 6B, the vacuum conveying apparatus 100 adheres an edge of the material M of a predetermined width, to be adhered, on the right side in the figure, and conveys the same in the direction orthogonal to the conveyer 20 to be thereby placed on another conveyer 31 or 32. In the series of operations described as above, the rise and fall of the vacuum face 120, separation of the material M, and so forth are the same as described with reference to FIG. 6A.

INDUSTRIAL APPLICABILITY

The invention provides a vacuum conveying apparatus capable of rapidly executing release operation by enabling even sticky material adhered to be immediately and reliably released at a release position, and the vacuum conveying apparatus is quite useful as the same can adhere, for example, an intermediate process material for tire, particularly, sticky material such as a carcass material including plies, belt, and so forth, for high-speed conveyance, and forcefully separate the same at a predetermined position to thereby prevent adhesion.

The invention claimed is:

1. A vacuum conveying apparatus, comprising:
   an upper frame;
   a lower frame capable of making up and down moves in relation to the upper frame;
   a vacuum duct provided within the lower frame; and
   a vacuum face provided on the lower frame,
   wherein the vacuum face includes vacuum suction orifices disposed below said vacuum duct and in communication with said vacuum duct, and a plurality of vacuum suction grooves in communication with both ends of the vacuum duct, said plurality of vacuum suction grooves disposed in parallel with each other along a longitudinal direction of the vacuum face, and only in regions at respective ends of the vacuum face which are not below the vacuum duct.

2. A vacuum conveying apparatus according to claim 1, wherein the vacuum face further includes a plurality of second vacuum suction grooves disposed in parallel with each other, in regions at respective ends of the vacuum face, other than the region below the vacuum duct, wherein said second vacuum suction grooves are disposed perpendicular to the vacuum suction grooves, so that the vacuum suction grooves and the second vacuum suction grooves together form a shape substantially resembling the letter L in a plan view.

3. A vacuum conveying apparatus according to claim 1 or 2, wherein the vacuum face is provided with a plurality of press-down pins capable of protruding downward from the vacuum face at a position where the lower frame comes down at the time of release of suction by the vacuum conveying apparatus.

4. A vacuum conveying apparatus according to claim 3, wherein the vacuum face has an adhesion-prevention surface treatment provided thereon, and the vacuum face is provided with a plurality of air nozzles for jetting air to material suctioned to the vacuum face at the time of the release of the suction by the vacuum conveying apparatus.

5. A vacuum conveying apparatus according to claim 3, wherein the upper frame and the lower frame constitute a toggle mechanism driven by respective motions of a cylinder, and a piston, and said toggle mechanism is provided with links, one end of each of the links, being coaxially and pivotally attached to a piston rod of the piston while the other end thereof being pivotally attached to the upper frame, or the lower frame.

6. A vacuum conveying apparatus according to claim 1 or 2, wherein the vacuum face has an adhesion-prevention surface treatment provided thereon, and the vacuum face is provided with a plurality of air nozzles for jetting air to material suctioned to the vacuum face at the time of the release of the suction by the vacuum conveying apparatus.

7. A vacuum conveying apparatus according to claim 6, wherein the upper frame and the lower frame constitute a toggle mechanism driven by respective motions of a cylinder, and a piston, and said toggle mechanism is provided with links, one end of each of the links, being coaxially and pivotally attached to a piston rod of the piston while the other end thereof being pivotally attached to the upper frame, or the lower frame.

8. A vacuum conveying apparatus according to claim 1 or 2, wherein the upper frame and the lower frame constitute a toggle mechanism driven by respective motions of a cylinder, and a piston, and said toggle mechanism is provided with links, one end of each of the links, being coaxially and pivotally attached to a piston rod of the piston while the other end thereof being pivotally attached to the upper frame, or the lower frame.

9. A vacuum conveying apparatus according to claim 1, wherein said plurality of vacuum suction grooves are disposed in a direction of a flow of sucked air along a longitudinal direction of the vacuum face, and said plurality of vacuum suction grooves are directly in communication with said vacuum duct.

10. A vacuum conveying apparatus according to claim 1, wherein the vacuum duct extends along a longitudinal direction of the lower frame between the vacuum grooves.

11. A vacuum conveying apparatus comprising:
an upper frame;
a toggle mechanism including a cylinder, a piston having a piston rod, a first link and a second link; and
a lower frame provided with a vacuum face, the lower frame capable of making up and down moves in relation to the upper frame through operation of the toggle mechanism;
wherein the toggle mechanism extendably connects the upper frame with the lower frame, and wherein one end of said first link is coaxially and pivotally attached to the piston rod of the piston, one end of said second link is coaxially and pivotally attached to the piston rod of the piston, an other end of said first link is pivotally attached to the upper frame, and an other end of said second link is pivotally attached to the lower frame in such a manner that the lower frame moves from a top dead center position to a bottom dead center position thereof and then back to the top dead center position while the piston makes a single movement from a most retracted position to a full extended position thereof in the cylinder.

\* \* \* \* \*